United States Patent
Hamilton et al.

(10) Patent No.: US 9,325,804 B2
(45) Date of Patent: Apr. 26, 2016

(54) DYNAMIC IMAGE RESULT STITCHING

(75) Inventors: Justin David Hamilton, Bellevue, WA (US); Yue Ma, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 193 days.

(21) Appl. No.: 12/941,747

(22) Filed: Nov. 8, 2010

(65) Prior Publication Data
US 2012/0113148 A1 May 10, 2012

(51) Int. Cl.
*G09G 5/00* (2006.01)
*G06F 17/30* (2006.01)
*H04L 29/08* (2006.01)
*G06T 11/00* (2006.01)

(52) U.S. Cl.
CPC ...... *H04L 67/2895* (2013.01); *G06F 17/30265* (2013.01); *G06T 11/00* (2013.01); *H04L 67/2838* (2013.01); *H04L 67/02* (2013.01)

(58) Field of Classification Search
CPC ............... G09G 5/14; G09G 2340/10; G09G 2340/125; G09G 1/007; G06T 11/60; G06T 11/206; H04N 5/44504; G06F 3/0481; G01S 7/06
USPC ......................................................... 345/629
See application file for complete search history.

(56) References Cited

U.S. PATENT DOCUMENTS

| | | | |
|---|---|---|---|
| 5,495,576 A * | 2/1996 | Ritchey | 345/420 |
| 5,873,080 A * | 2/1999 | Coden et al. | |
| 6,332,146 B1 * | 12/2001 | Jebens et al. | |
| 6,356,297 B1 * | 3/2002 | Cheng et al. | 348/36 |
| 6,366,899 B1 * | 4/2002 | Kernz | |
| 6,466,254 B1 * | 10/2002 | Furlan et al. | 348/36 |
| 6,629,104 B1 * | 9/2003 | Parulski et al. | 382/307 |
| 6,640,232 B2 * | 10/2003 | Kernz | |
| 6,643,666 B1 * | 11/2003 | Kernz | |
| 7,281,208 B2 | 10/2007 | Kerr | |

(Continued)

FOREIGN PATENT DOCUMENTS

| CN | 1694408 A | 11/2005 |
|---|---|---|
| CN | 101315629 A | 12/2008 |

(Continued)

OTHER PUBLICATIONS

Image Composite Editor—Published Date: Jun. 2010 http://research.microsoft.com/en-us/um/redmond/groups/ivm/ICE/.

(Continued)

*Primary Examiner* — Todd Buttram
(74) *Attorney, Agent, or Firm* — Dave Ream; Tom Wong; Micky Minhas

(57) ABSTRACT

Methods and systems for compiling image results into compilation images so that multiple image results may be downloaded via a single browser-download connection are provided. An image search request is received and a plurality of image results that satisfy the image search request are determined. At least a portion of the image results determined to satisfy the search request are dynamically stitched together to create a compilation image. Upon receiving an image download request for a satisfying image result, the compilation image is returned to the user's browser rather than a single thumbnail image. In this way, a plurality of image results is returned via a single browser-download connection and the latency in returning a large number of request-satisfying image results is decreased.

19 Claims, 4 Drawing Sheets

(56) References Cited

U.S. PATENT DOCUMENTS

| | | |
|---|---|---|
| 7,460,730 B2 | 12/2008 | Pal et al. |
| 7,778,485 B2 | 8/2010 | Zeineh et al. |
| 8,538,074 B2 | 9/2013 | Nakamura et al. |
| 2002/0063725 A1* | 5/2002 | Tarbutton et al. ............ 345/629 |
| 2003/0004760 A1* | 1/2003 | Schiff et al. ....................... 705/5 |
| 2004/0177009 A1* | 9/2004 | Schrenk ......................... 705/27 |
| 2006/0155684 A1* | 7/2006 | Liu et al. ........................... 707/3 |
| 2006/0177150 A1* | 8/2006 | Uyttendaele et al. ......... 382/284 |
| 2006/0291747 A1* | 12/2006 | Peterson ....................... 382/284 |
| 2007/0025723 A1* | 2/2007 | Baudisch et al. ............. 396/287 |
| 2007/0299830 A1* | 12/2007 | Muenchhoff et al. ............ 707/3 |
| 2008/0111831 A1* | 5/2008 | Son et al. ...................... 345/629 |
| 2008/0205795 A1 | 8/2008 | Marques et al. |
| 2009/0015717 A1 | 1/2009 | Arnao |
| 2009/0051778 A1 | 2/2009 | Pan |
| 2009/0208118 A1 | 8/2009 | Csurka |
| 2009/0240666 A1 | 9/2009 | Noguchi |
| 2009/0290812 A1* | 11/2009 | Naaman et al. ............... 382/305 |
| 2010/0014780 A1 | 1/2010 | Kalayeh |
| 2010/0199160 A1 | 8/2010 | Klassen |
| 2010/0262616 A1 | 10/2010 | Eskolin et al. |

FOREIGN PATENT DOCUMENTS

| | | |
|---|---|---|
| EP | 2105853 A1 | 9/2009 |
| JP | 11167552 A | 6/1999 |
| JP | 2000276484 A | 10/2000 |
| JP | 2007025960 A | 2/2007 |
| JP | 2007312240 A | 11/2007 |
| JP | 2009223865 A | 10/2009 |
| JP | 4709070 B2 | 3/2011 |
| TW | M372955 U | 1/2010 |
| TW | 201023628 A | 6/2010 |
| WO | 2009120440 A1 | 10/2009 |

OTHER PUBLICATIONS

International Search Report with Written Opinion mailed May 18, 2012 in PCT/US2011/058513, 10 pages.
European Supplementary Search Report mailed Feb. 27, 2014, in Appl. No. 11839498, 6 pages.
CN Search Report dated Apr. 15, 2014 in Patent Application 201110349836.9.
"Office Action Issued in Chinese Patent Application No. 201110349836.9", Mailed Date: Apr. 15, 2015, 16 Pages.
"Office Action Issued in Chinese Patent Application No. 201110349836.9," Mailed Date: Apr. 15, 2015, 17 Pages.
"Office Action Issued in Japanese Patent Application No. 2013-538776", Mailed Date: Sep. 16, 2015, 6 Pages.
"Third Office Action Received for China Patent Application No. 201110349836.9", Mailed Date: Oct. 21, 2014, 17 Pages.
Taiwan Search Report dated Sep. 11, 2015 in Taiwan Application No. 100136307, 1 page.

* cited by examiner

DYNAMIC IMAGE RESULT STITCHING

BACKGROUND

When a user queries an image search vertical through his or her browser requesting images that satisfy a particular query, multiple, discreet images are often returned to the user in response. Generally, each image result is a thumbnail image that must be loaded onto the user's browser individually. As a result, the user's browser has to make a browser-download request for each individual image thumbnail. However, modern browsers have limitations on the number of browser-download connections that can be established at any one time. Thus, if a large number of image results are identified as satisfying the user's query, an equally large number of browser-download connections must be established. Such multiple connections result in large latencies and a high page load time as all the image thumbnails download.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Embodiments of the present invention relate to systems, methods, and computer-readable media for, among other things compiling image results into compilation images so that multiple image results may be downloaded via a single browser-download connection. An image search request is received, for instance, via an image search vertical, and a plurality of image results that satisfy the image search request are determined. At least a portion of the image results determined to satisfy the search request are dynamically stitched together to create a compilation image. Then, upon receiving an image download request for a satisfying image result, the compilation image is returned to the user's browser rather than a single thumbnail image. In this way, a plurality of image results is returned via a single browser-download connection and the latency in returning a large number of request-satisfying image results is decreased.

BRIEF DESCRIPTION OF THE DRAWINGS

The present invention is illustrated by way of example and not limited in the accompanying figures in which like reference numerals indicate similar elements and in which.

DETAILED DESCRIPTION

Figure 1:
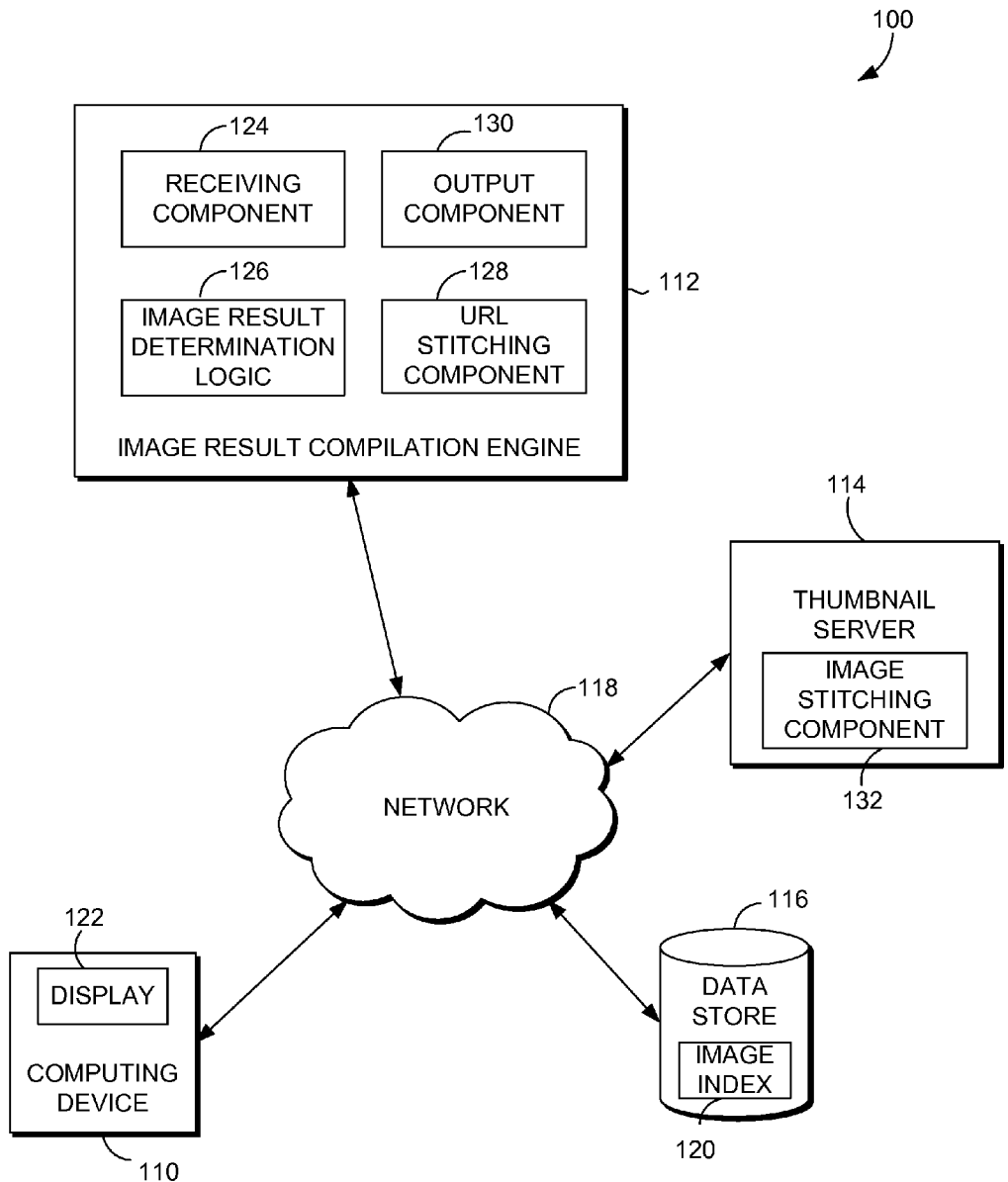
FIG. 1 is a block diagram of an exemplary computing system environment suitable for use in implementing embodiments of the present invention.

The subject matter of the present invention is described with specificity herein to meet statutory requirements. However, the description itself is not intended to limit the scope of this patent. Rather, the inventor has contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Various aspects of the technology described herein are generally directed to systems, methods, and computer-readable media for, among other things, compiling a plurality of image results into compilation images so that multiple image results may be downloaded via a single browser-download connection. An image search request is received, for instance, via an image search vertical, and a plurality of image results that satisfy the image search request are determined. At least a portion of the image results determined to satisfy the search request are dynamically stitched together to create a compilation image. Then, upon receiving an image download request for image results satisfying the request, the compilation image may be returned to the user's browser rather than a single thumbnail image. In this way, a plurality of image results is returned via a single browser-download connection and the latency in returning a large number of request-satisfying image results is decreased.

Also returned to the user's browser is a description file containing display offset instructions pertaining to each image result included in the compilation image. The offset instructions permit application of a masking window to the compilation image in accordance with the offset instructions such that only a portion of the compilation image that corresponds to each of the plurality of image results included therein is visible to the user as that respective image result. Accordingly, embodiments of the present invention permit decreased latency in rendering a search engine results page comprising a plurality of individual image results but does so in a manner that is otherwise visually transparent to the user. That is, the user is visually unaware that the image results were received by his or her browser as a compilation image as each image result appears to render individually as an image result that satisfies the received request.

Accordingly, in one embodiment, the present invention is directed to one or more computer-storage media having computer-executable instructions embodied thereon, that when executed, cause a computing device to perform a method for compiling a plurality of image results into one or more compilation images. The method includes receiving an image search request, determining a plurality of image results that satisfy the image search request, and stitching at least a portion of the plurality of image results to create a compilation image, the portion including at least two of the plurality of image results. The method further includes providing the compilation image for display in association with a search engine results page.

In another aspect, the present invention is directed to one or more computer-storage media having computer-executable instructions embodied thereon, that when executed, cause a computing device to perform a method for compiling a plurality of image results into one or more compilation images. The method includes receiving one or more stitching instructions from a user, wherein the one or more stitching instructions comprise one of a quantity of images to be stitched to create a compilation image and a preference on resizing of image results from a user. The method further includes receiving an image search request from the user, determining a plurality of image results that satisfy the image search request, applying the one or more stitching instructions to the image results, and stitching at least a portion of the plurality of image results to create the compilation image, the portion including at least two of the plurality of image results. Still further, the method includes providing the compilation image for display in association with a search engine results page.

In yet another aspect, the present invention is directed to an image result compilation system comprising a computing device associated with one or more processors and one or more computer storage media, a data store coupled with the computing device, an image result compilation engine, and a thumbnail server. The image result compilation engine receives an image search request and determines a plurality of image results that satisfy the image search request. The thumbnail server stitches at least a portion of the plurality of image results to create a compilation image, the portion including at least two of the plurality of image results, and provides the compilation image for display in association with a search engine results page.

Turning now to FIG. 1, a block diagram is illustrated that shows an exemplary computing system environment 100 suitable for use in implementing embodiments of the present invention. It will be understood and appreciated by those of ordinary skill in the art that the computing system environment 100 shown in FIG. 1 is merely an example of one suitable computing system environment and is not intended to suggest any limitation as to the scope of use or functionality of embodiments of the present invention. Neither should the computing system environment 100 be interpreted as having any dependency or requirement related to any single module/component or combination of modules/components illustrated therein.

The computing system environment 100 includes a computing device 110, an image result compilation engine 112, a thumbnail server 114, and a data store 116, all in communication with one another via a network 118. The network 118 may include, without limitation, one or more local area networks (LANs) and/or wide area networks (WANs). Such networking environments are commonplace in offices, enterprise-wide computer networks, intranets and the Internet. Accordingly, the network 118 is not further described herein.

In some embodiments, one or more of the illustrated components/modules may be implemented as stand-alone applications. In other embodiments, one or more of the illustrated components/modules may be integrated directly into the operating system of the image result compilation engine 112 and/or the end-user computing device 110. It will be understood by those of ordinary skill in the art that the components/modules illustrated in FIG. 1 are exemplary in nature and in number and should not be construed as limiting. Any number of components/modules may be employed to achieve the desired functionality within the scope of embodiments hereof. Further, components/modules may be located on any number of servers or client computing devices. By way of example only, the image result compilation engine 112 might reside on a server, cluster of servers, or a computing device remote from one or more of the remaining components.

It should be understood that this and other arrangements described herein are set forth only as examples. Other arrangements and elements (e.g., machines, interfaces, functions, orders, and groupings of functions, etc.) can be used in addition to or instead of those shown, and some elements may be omitted altogether. Further, many of the elements described herein are functional entities that may be implemented as discrete or distributed components or in conjunction with other components/modules, and in any suitable combination and location. Various functions described herein as being performed by one or more entities may be carried out by hardware, firmware, and/or software. For instance, various functions may be carried out by a processor executing instructions stored in memory.

The data store 116 is configured to store information associated with images and image identifiers, prior image search requests, and compilation images. In various embodiments, such information may include, without limitation, a plurality of individual images (which may include video images) and an image identifier associated with each one of the plurality of individual images, the identifiers being organized into an image index 120. In embodiments, the data store 116 is configured to be searchable for one or more of the items stored in association therewith. It will be understood and appreciated by those of ordinary skill in the art that the information stored in association with the data store 116 may be configurable and may include any information relevant to images, image identifiers, prior image search requests, compilation images, and/or the like. The content and volume of such information are not intended to limit the scope of embodiments of the present invention in any way. Further, though illustrated as a single, independent component, the data store 116 may, in fact, be a plurality of storage devices, for instance a database cluster, portions of which may reside on the image result compilation engine 112, the computing device 110, another external computing device (not shown), and/or any combination thereof.

Each of the computing device 110, the image result compilation engine 112, and the thumbnail server 114 shown in FIG. 1 may be any type of computing device, such as, for example, computing device 400 described below with reference to FIG. 4. By way of example only and not limitation, each of the computing device 110, the image result compilation engine 112, and the thumbnail server 114 may be a personal computer, desktop computer, laptop computer, handheld device, mobile handset, consumer electronic device, or the like. It should be noted, however, that embodiments are not limited to implementation on such computing devices, but may be implemented on any of a variety of different types of computing devices within the scope of embodiments hereof.

Components of the computing device 110, the image result compilation engine 112, and the thumbnail server 114 (not shown for clarity) may include, without limitation, a processing unit, internal system memory, and a suitable system bus for coupling various system components, including one or more databases for storing information (e.g., files and metadata associated therewith). Each of the computing device 110, the image result compilation engine 112, and the thumbnail server 114 typically includes, or has access to, a variety of computer-readable media. By way of example, and not limitation, computer-readable media may include computer-storage media and communication media. In general, communication media enables each server to exchange data via a network, e.g., network 118. More specifically, communication media may embody computer-readable instructions, data structures, program modules, or other data in a modulated data signal, such as a carrier wave or other transport mechanism, and may include any information-delivery media. As used herein, the term "modulated data signal" refers to a signal that has one or more of its attributes set or changed in such a manner as to encode information in the signal. By way of example, and not limitation, communication media includes wired media such as a wired network or direct-wired connection, and wireless media such as acoustic, RF, infrared, and other wireless media. Combinations of any of the above also may be included within the scope of computer-readable media.

It will be understood by those of ordinary skill in the art that computing system environment 100 is merely exemplary. While the image result compilation engine 112 and the thumbnail server 114 are illustrated as single units, one skilled in the art will appreciate that the image result compilation engine 112 and the thumbnail server 114 are scalable. For example, the image result compilation engine 112 and/or the thumbnail server 114 may in actuality include a plurality of computing devices in communication with one another. Moreover, the data store 116, or portions thereof, may be included within, for instance, the image result compilation engine 112, the thumbnail server 114, and/or the computing device 110 as a computer-storage medium. The single unit depictions are meant for clarity, not to limit the scope of embodiments in any form.

As shown, the end-user computing device 110 includes a display screen 122. The display screen 122 is configured to display information to the user of the computing device 110, for instance, information relevant to communications initiated by and/or received by the computing device 110, image search requests, search engine result pages including one or more image results, and the like. Embodiments are not intended to be limited to visual display but rather may also include audio presentation, combined audio/visual presentation, and the like.

As shown in FIG. 1, the image result compilation engine 112 includes a receiving component 124, image result determination logic 126, a uniform resource locator (URL) stitching component, and an output component 130. In some embodiments, one or more of the components 124, 126, 128, and 130 may be implemented as stand-alone applications. In other embodiments, one or more of the components 124, 126, 128, and 130 may be integrated directly into the operating system of the computing device 110. It will be understood by those of ordinary skill in the art that the components 124, 126, 128, and 130 illustrated in FIG. 1 are exemplary in nature and in number and should not be construed as limiting. Any number of components may be employed to achieve the desired functionality within the scope of embodiments hereof.

The receiving component 124 is configured to receive an image search request. In embodiments, a user inputs an image search request into a search query input box (not shown) configured for searching for satisfying results in an image search vertical, e.g., utilizing end-user computing device 110. When the user enters the search request, it is transmitted, through network 118 to the image result compilation engine 112 and received by the receiving component 124.

The image result determination logic 126 is configured to receive an image search request from the receiving component 124 and to determine a plurality of image results that satisfy the received request. In embodiments, the image result determination logic 126 queries the image index 120 of the data store 116 (through network 118) to identify or determine search-request-satisfying images, each search-request-satisfying image having an image identifier associated therewith that is indexed in the image index. In one embodiment, the image identifier is a URL associated with the particular image. In another embodiment, the image identifier is an alpha-numeric value uniquely assigned to the particular image. Any and all such variations, and any combination thereof, are contemplated to be within the scope of embodiments of the present invention. The image result determination logic 126 is further configured to receive the image identifiers for each search-request-satisfying image.

The URL stitching component 128 is configured to receive the image identifiers for each search-request-satisfying image from the image result determination logic 126 and to construct a URL that includes all such identifiers. That is, the URL stitching component 128 creates a URL that, within itself, contains all necessary information for each search-request-satisfying image to be requested, for instance, from the thumbnail server 114, as more fully described below.

In embodiments, the output component 130 is configured to transmit the stitched URL to the computing device 110. Upon receipt, the computing device 110 is configured to begin to render the search engine results page (SERP) in association with which the search-request-satisfying image results will be rendered. At this stage, however, the result images themselves have yet to be retrieved. As such, although an image result place holder (for instance, a bounded blank box) may begin to render but the images themselves will not yet render.

The output component 130 is also configured to transmit the stitched URL to the thumbnail server 114 (via network 118) to request the image results having identifiers that comprise the stitched URL. In this embodiment, each individual image result thumbnail is retrieved based upon the identifier there for that is included in the stitched URL. The image stitching component 132 of the thumbnail server 114 then stitches the thumbnail image results into a compilation image. A compilation image is a single image comprised of a plurality of image results stitched together to create a larger image having a plurality of portions, each portion corresponding to a single image result. Thus, for instance, if thirty image results are determined to satisfy a particular image search request, thumbnails of the thirty image results may be stitched together to create a single compilation image having thirty portions, each portion corresponding to one of the thirty image results.

In embodiments, one or more of the image result thumbnails may be cropped or otherwise resized prior to stitching. Such cropping/re-sizing may be done base upon an input user preference, available display space for each image result on the to-be-rendered page, to eliminate "white space" on the stitched image, or for any number of other reasons.

The compilation image may then be returned to the output component 130 (via network 118) and the output component 130 may be configured to transmit the compilation image to the computing device 110 (via network 118). In another embodiment, the compilation image may be transmitted directly from the thumbnail server 114 to the computing device 110 (via network 118) for display. Any and all such variations, and any combination thereof, are contemplated to be within the scope of embodiments of the present invention.

It will be understood and appreciated by those of ordinary skill in the art that the output component 130 may be configured to transmit the stitched URL to the thumbnail server 114, the computing device 110, or both within the scope of embodiments hereof. In the event that the output component 130 transmits the stitched URL only to the computing device 110 and not to the thumbnail server 114, the computing device is configured to transmit the stitched URL directly to the thumbnail server 114.

It will be further understood and appreciated that multiple stitched images may be compiled as a result of a single received image search request. For instance, if 100 search-request-satisfying image results are determined in response to a received search request, the image results may be "batched" into five batches of twenty results, four batches of twenty-five results, or the like. URLs comprised of identifiers for the image results comprising a single batch may then be constructed and compilation images corresponding to each batch-constructed URL may be compiled. In this way, in keeping with the example, four or five (HTTP) requests for images may be made to the thumbnail server 114 instead of one hundred separate (HTTP) requests. The image results comprising a compiled image may all be displayed on a single SERP or may span multiple SERPs. Likewise, a single SERP may contain image results from a single compiled image or from several compiled images. Any and all such variations, and any combination thereof, are contemplated to be within the scope of embodiments of the present invention. The quantity of image results compiled into a single image may be set as a preference or stitching instruction by a user prior to an image search request being conducted.

In addition to transmitting the compilation image to the output component 130 of the image result compilation engine 112, the computing device 110, or both, the thumbnail server 114 is further configured to transmit a description file containing display offset instructions pertaining to each image result included in the compilation image. The offset instructions permit application of a masking window to the compilation image in accordance with the offset instructions such that only a portion of the compilation image that corresponds to each of the plurality of image results included therein is visible to the user as that respective image result. In one embodiment, this functionality is enabled utilizing CSS. Accordingly, embodiments of the present invention permit decreased latency in rendering a search engine results page comprising a plurality of individual image results but does so in a manner that is otherwise visually transparent to the user. That is, the user is visually unaware that the image results were received by his or her browser as a compilation image as each image result appears to render individually as an image result that satisfies the received request.

Figure 2:
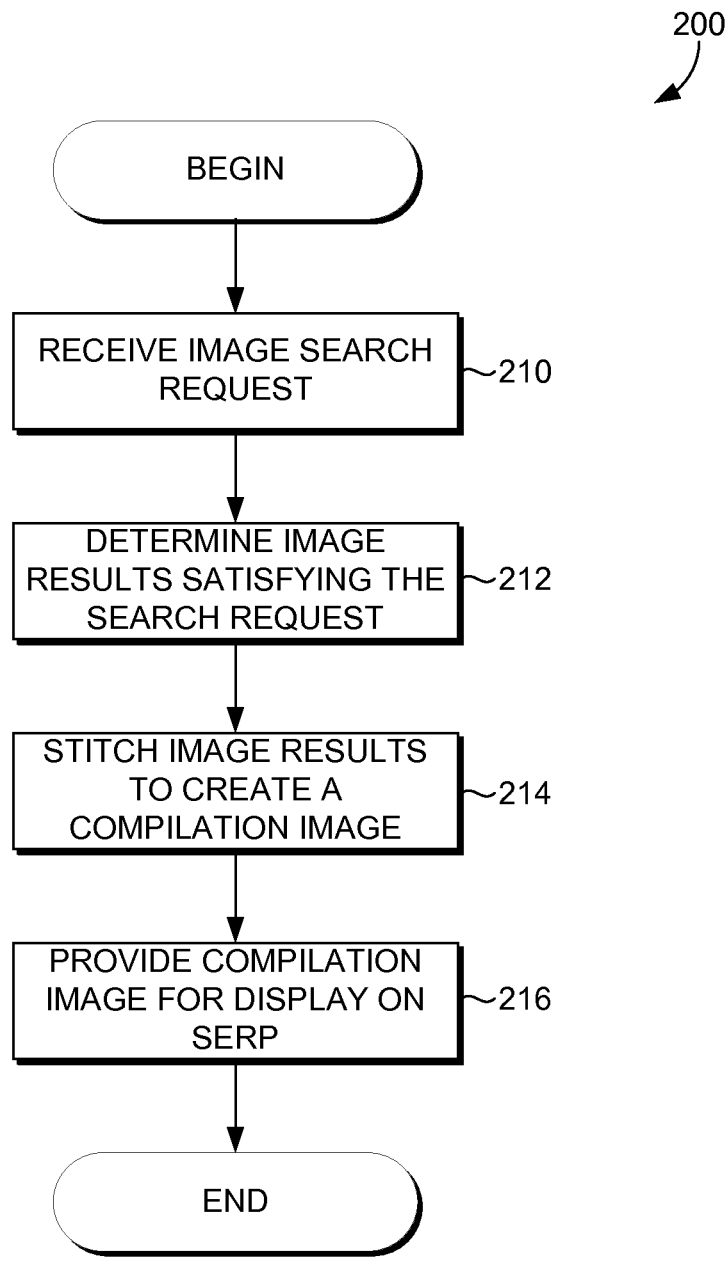
FIG. 2 is a flow diagram showing a method for compiling image results into compilation images, in accordance with embodiments of the present invention.

With reference to FIG. 2, a flow diagram is illustrated showing a method 200 for compiling a plurality of image results into one or more compilation images, in accordance with an embodiment of the present invention. As shown at block 210, an image search request is received (for instance, by the receiving component 124 of the image result compilation engine 112, from the computing device 110, and through the network 118 of FIG. 1). A plurality of image results that satisfy the image search request are determined, as indicated at block 212. In one exemplary embodiment, the satisfying image results are determined by the image result determination logic 126 querying the data store 116 of FIG. 1.

Next, as indicated at block 214, at least a portion of the plurality of image results are stitched together to create a single compilation image, the portion including at least two image results. In an exemplary embodiment (with reference to FIG. 1), the computing device 110 sends a stitched URL containing identifiers for each of the portion of the plurality of image results to the thumbnail server 114, and the image stitching component 132 of the thumbnail server 114 stitches the image results so identified into a single compilation image. The compilation image is then provided for display (for instance, on the display 122 of the end-user computing device 110 of FIG. 1) in association with a search engine results page, as indicated at block 216.

Figure 3:
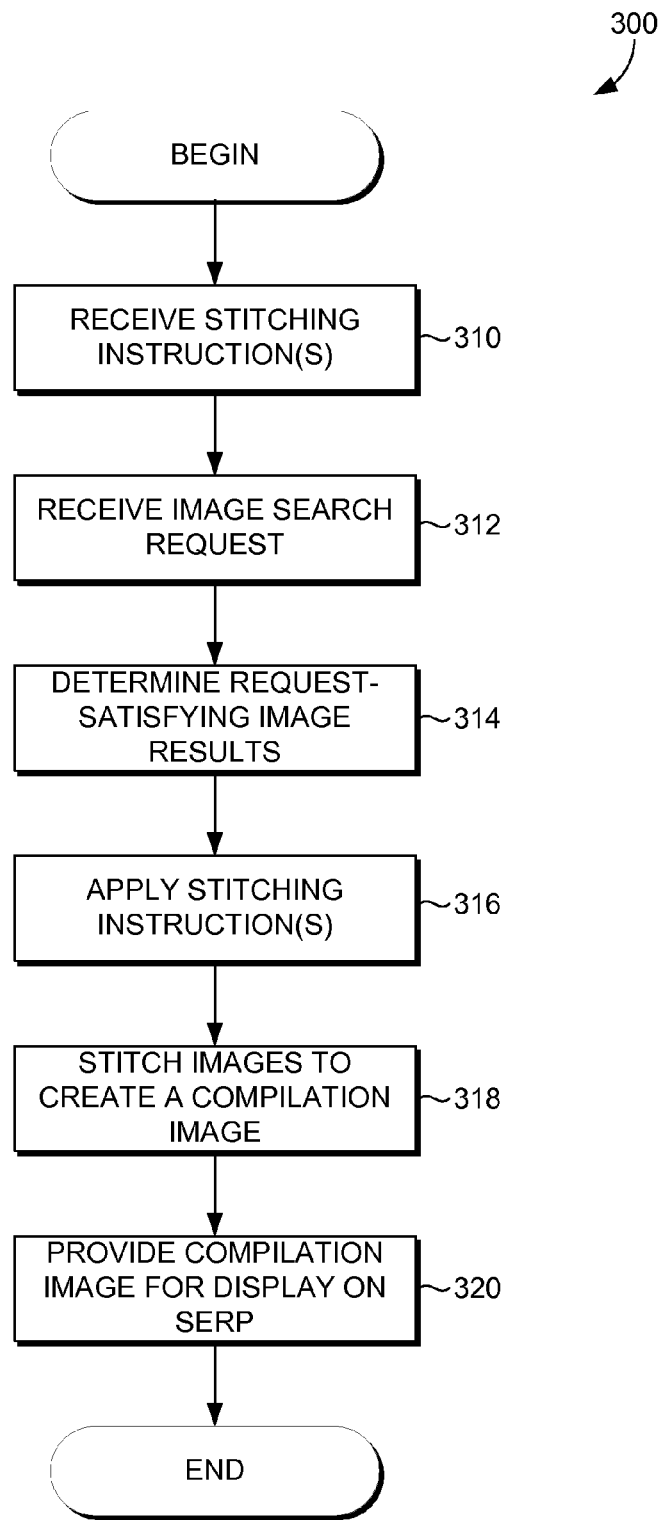
FIG. 3 is a flow diagram showing another method for compiling image results into compilation images, in accordance with embodiments of the present invention.

Turning now to FIG. 3, a flow diagram is illustrated showing a method 300 for compiling a plurality of image results into one or more compilation images, in accordance with an embodiment of the present invention. As shown at block 310, at least one stitching instruction is received from a user. Such stitching instructions may include, without limitation, a quantity of images to be stitched to create a compilation image (e.g., a set "batch" size for creating compilation images which may or may not be dependent on a number of satisfying image results determined) and a preference on resizing of image results (e.g., a user-preference for cropping or resizing the individual image results that will comprise the compilation image to at least closely approximate the available display space in association with the rendered page). In an exemplary embodiment, such stitching instruction is received from the user prior to the user engaging in search behavior that will cause image result compilation to take place.

As shown at block 312, an image search request is received (for instance, by the receiving component 124 of the image result compilation engine 112, from the computing device 110, and through the network 118 of FIG. 1). A plurality of image results that satisfy the image search request are determined, as indicated at block 314. In one exemplary embodiment, the satisfying image results are determined by the image result determination logic 126 querying the data store 116 of FIG. 1.

Next, as indicated at block 316, the at least one stitching instruction is applied to the determined satisfying image results. Thus, by way of example, if a batch-sizing instruction is received, the result images may be divided into batches of a specified size. Or if a cropping or resizing instruction is received, one or more of the determined satisfying image results may be cropped or otherwise resized in accordance with the available display space on the to-be-rendered page.

Next, as indicated at block 318, at least a portion of the plurality of image results are stitched together to create a single compilation image, the portion including at least two image results. In an exemplary embodiment (with reference to FIG. 1), the computing device 110 sends a stitched URL containing identifiers for each of the portion of the plurality of image results to the thumbnail server 114, and the image stitching component 132 of the thumbnail server 114 stitches the image results so identified into a single compilation image. The compilation image is then provided for display (for instance, on the display 122 of the end-user computing device 110 of FIG. 1) in association with a search engine results page, as indicated at block 320.

Exemplary Operating Environment

A first exemplary operating environment in which various aspects of the present invention may be implemented is described below in order to provide a general context for various aspects of the present invention. Referring to FIG. 4 in particular, an exemplary operating environment for implementing embodiments of the present invention is shown and designated generally as computing device 400. The computing device 400 is but one example of a suitable computing environment and is not intended to suggest any limitation as to the scope of use or functionality of the invention. Neither should the computing device 400 be interpreted as having any dependency or requirement relating to any one or combination of components illustrated.

Embodiments of the invention may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. Embodiments of the invention may be practiced in a variety of system configurations, including hand-held devices, consumer electronics, general-purpose computers, more specialty computing devices, etc. Embodiments of the invention may also be practiced in distributed computing environments where tasks are performed by remote-processing devices that are linked through a communications network.

Figure 4:
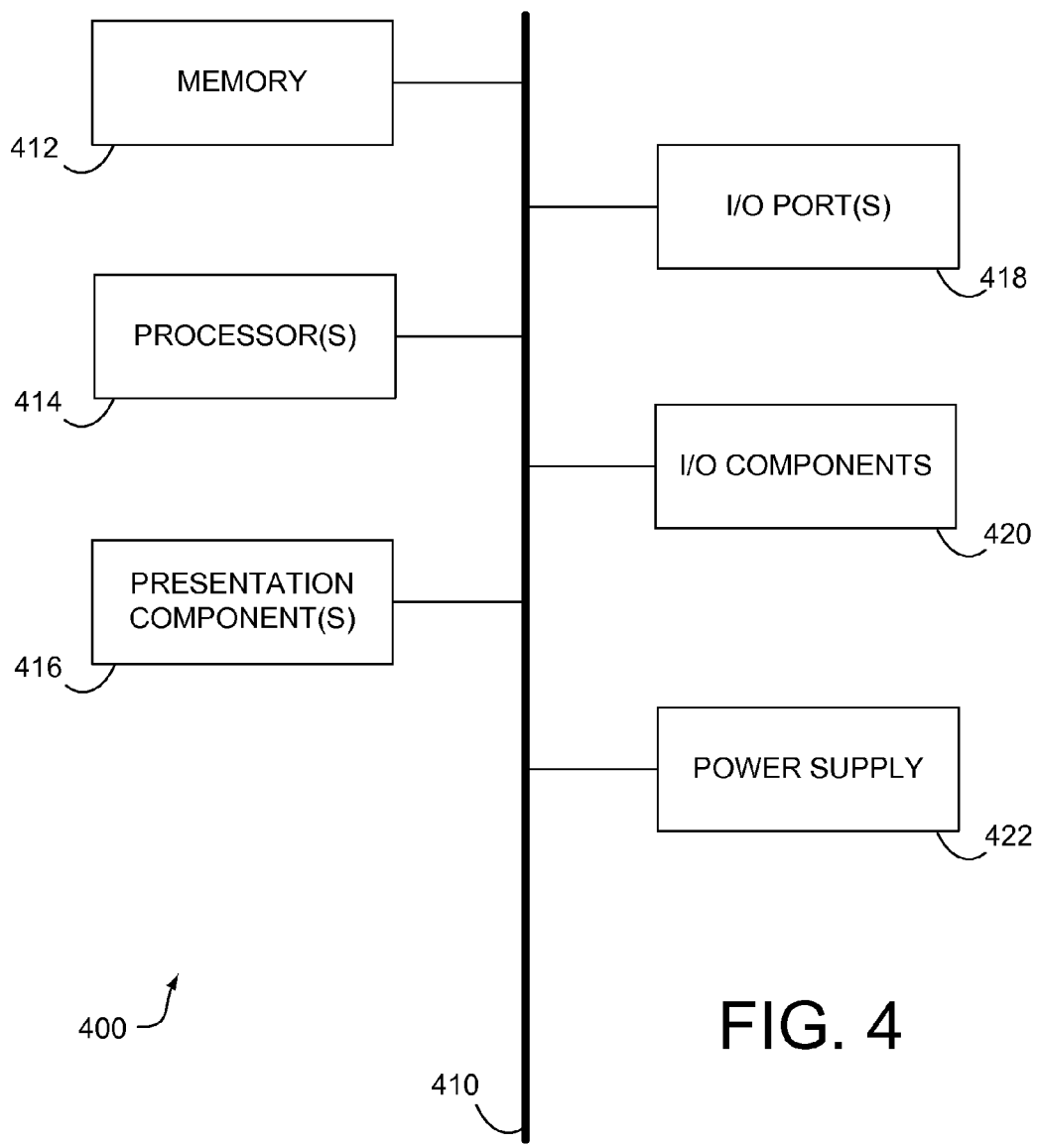
FIG. 4 is a block diagram showing an exemplary computing system environment suitable for implementing embodiments of the present invention.

With continued reference to FIG. 4, the computing device 400 includes a bus 410 that directly or indirectly couples the following devices: memory 412, one or more processors 414, one or more presentation components 416, input/output ports 418, input/output components 420, and an illustrative power supply 422. The bus 410 represents what may be one or more busses (such as an address bus, data bus, or combination thereof). Although the various blocks of FIG. 4 are shown with lines for the sake of clarity, in reality, delineating various components is not so clear, and metaphorically, the lines would more accurately be grey and fuzzy. For example, one may consider a presentation component such as a display device to be an I/O component. Additionally, many processors have memory. The inventors hereof recognize that such is the nature of the art, and reiterate that the diagram of FIG. 4 is merely illustrative of an exemplary computing device that can be used in connection with one or more embodiments of the present invention. Distinction is not made between such categories as "workstation," "server," "laptop," "hand-held device," etc., as all are contemplated within the scope of FIG. 4 and reference to "computing device."

The computing device 400 typically includes a variety of computer-readable media. Computer-readable media can be any available media that can be accessed by computing device 400 and includes both volatile and nonvolatile media, removable and non-removable media. By way of example, and not limitation, computer-readable media may comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 400. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

The memory 412 includes computer-storage media in the form of volatile and/or nonvolatile memory. The memory may be removable, non-removable, or a combination thereof. Exemplary hardware devices include solid-state memory, hard drives, optical-disc drives, etc. Computing device 400 includes one or more processors that read data from various entities such as memory 412 or I/O components 420. Presentation component(s) 416 present data indications to a user or other device. Exemplary presentation components include a display device, speaker, printing component, vibrating component, etc.

The I/O ports 418 allow computing device 400 to be logically coupled to other devices including the I/O components 420, some of which may be built in. Illustrative components include a microphone, joystick, game pad, satellite dish, scanner, printer, wireless device, etc.

Aspects of the subject matter described herein may be described in the general context of computer-executable instructions, such as program modules, being executed by a mobile device. Generally, program modules include routines, programs, objects, components, data structures, and so forth, which perform particular tasks or implement particular abstract data types. Aspects of the subject matter described herein may also be practiced in distributed computing environments where tasks are performed by remote processing devices that are linked through a communications network. In a distributed computing environment, program modules may be located in both local and remote computer storage media including memory storage devices.

Furthermore, although the term server is often used herein, it will be recognized that this term may also encompass a client, a set of one or more processes distributed on one or more computers, one or more stand-alone storage devices, a set of one or more other devices, a combination of one or more of the above, and the like.

CONCLUSION

As can be seen, embodiments of the present invention provide systems, methods, and computer-readable media for, among other things compiling image results into compilation images so that multiple image results may be downloaded via a single browser-download connection. In this way, a plurality of image results is returned via a single browser-download connection and the latency in returning a large number of request-satisfying image results is decreased.

While the invention is susceptible to various modifications and alternative constructions, certain illustrated embodiments thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

It will be understood by those of ordinary skill in the art that the order of steps shown in the method 200 of FIG. 2 and the method 300 of FIG. 3 are not meant to limit the scope of the present invention in any way and, in fact, the steps may occur in a variety of different sequences within embodiments hereof. Any and all such variations, and any combination thereof, are contemplated to be within the scope of embodiments of the present invention.

The present invention has been described in relation to particular embodiments, which are intended in all respects to be illustrative rather than restrictive. Alternative embodiments will become apparent to those of ordinary skill in the art to which the present invention pertains without departing from its scope.

The invention claimed is:

1. One or more computer storage memory devices having computer-executable instructions embodied thereon that, when executed, perform a method for compiling a plurality of image results into compilation images, the method comprising:
 at a search engine, receiving a search request for an image;
 determining a plurality of individual image search results, each of which satisfies the search request for the image, wherein each individual image search result is associated with its own uniform resource locator (URL);

stitching at least two URLs, each associated with its own respective individual image search result of the plurality of individual image search results, to create a first stitched URL that corresponds to a first search result compilation image, wherein a quantity of hypertext transfer protocol (HTTP) requests required to download the individual image search results associated with the at least two URLs exceeds a quantity of HTTP requests required to download the first search result compilation image; and providing the first search result compilation image for display in association with a search engine results page (SERP).

2. The one or more computer storage memory devices of claim 1, wherein the first search result compilation image is capable of being downloaded via a single HTTP request.

3. The one or more computer storage memory devices of claim 1, wherein the method further comprises displaying each individual image search result comprising the first search result compilation image as a single image search result in association with the search engine results page (SERP).

4. The one or more computer storage memory devices of claim 3, wherein displaying each individual image search result as the single image search result in association with the search engine results page (SERP) comprises applying a masking window to the first search result compilation image such that only a portion of the first search result compilation image that corresponds to each single image search result is visible to the user.

5. The one or more computer storage memory devices of claim 1, wherein stitching the at least two URLs, each associated with its own respective individual image search result of the plurality of individual image search results to create the first stitched URL that corresponds to the first search result compilation image, further comprises stitching at least two additional URLs, each associated with its own respective individual image search result of the plurality of individual image search results other than the individual image search results used to create the first search result compilation image, to create a second stitched URL that corresponds to a second search result compilation image, thereby creating a plurality of stitched URLs each corresponding to a respective search result compilation image.

6. The one or more computer storage memory devices of claim 5, wherein a quantity of HTTP requests required to download all individual image search results associated with URLs used to create the first and second compilation images exceeds a quantity of HTTP requests required to download the first search result compilation image and the second search result compilation image.

7. The one or more computer storage memory devices of claim 1, wherein each individual image search result included in the at-least first search result compilation image is displayed in association with a single search engine results page (SERP).

8. The one or more computer storage memory devices of claim 5, wherein at least one of the individual image search results included in the first search result compilation image is displayed in association with a different search engine results page (SERP) than at least one other of the individual image search results included in the second search result compilation image.

9. The one or more computer storage memory devices of claim 1, wherein at least one of the individual image search results included in the at least first search result compilation image is resized prior to creation of the first search result compilation image.

10. The one or more computer storage memory devices of claim 1, wherein a preference on resizing of individual image search results is set by a user prior to the image search request being received.

11. One or more computer storage memory devices having computer-executable instructions embodied thereon that, when executed, perform a method for compiling a plurality of image search results into search result compilation images, the method comprising:

receiving one or more stitching instructions from a user, wherein the one or more stitching instructions comprise a preference on resizing of individual image search results;

receiving an image search request from the user;

determining a plurality of image search results, each of which satisfies the image search request, wherein each individual image search result of the plurality of image search results is associated with its own respective uniform resource locator (URL);

applying the one or more stitching instructions to at least two URLs, each associated with its own respective individual image search result of the plurality of individual image search results, to create one or more stitched URLs, each corresponding to a respective search result compilation image; and using the respective stitched URLs, providing the one or more search result compilation images for display in association with a search engine results page (SERP).

12. The one or more computer storage memory devices of claim 11, wherein providing the one or more search result compilation images for display in association with the search engine results page (SERP) comprises further providing a description file that describes a layout of the one or more search result compilation images on the search engine results page (SERP) and contains a reference to each individual image search result associated with the one or more search result compilation images.

13. The one or more computer storage memory devices of claim 11, wherein each of the one or more search result compilation images is capable of being downloaded via a respective single hypertext transfer protocol (HTTP) request.

14. The one or more computer storage memory devices of claim 11, wherein the method further comprises displaying each individual image search result associated with the one or more search result compilation images as a single image search result in association with the search engine results page (SERP).

15. The one or more computer storage memory devices of claim 14, wherein displaying each individual image search result associated with the one or more search result compilation images as the single image search result in association with the search engine results page (SERP) comprises applying a masking window to the one or more search result compilation images such that only a portion of the one or more search result compilation images that corresponds to each single image search result is visible to the user.

16. The one or more computer storage memory devices of claim 11, wherein stitching at least two URLs, each associated with its own respective individual image search result of the plurality of image search results, to create the one or more stitched URLs, each corresponding to a respective search result compilation image, comprises stitching at least two unique URLs, each associated with its own unique search result compilation image.

17. The one or more computer storage memory devices of claim 11, wherein each individual image search result associated with the one or more search result compilation images is displayed in association with a single search engine results page (SERP).

18. The one or more computer storage memory devices of claim 11, wherein at least one of the individual image search results associated with the one or more search result compilation images is displayed in association with a different search engine results page (SERP) than at least one other of the individual image search results associated with the one or more search result compilation images.

19. An image search result compilation system, comprising:
- a computing device associated with one or more processors and one or more computer storage media;
- a data store coupled with the computing device;
- an image search results compilation engine that receives a search request for an image at a search engine, and determines a plurality of individual image search results, each of which satisfies the image search request;
- a uniform resource locator (URL); stitching component configured to stitch URLs associated with each of the plurality of individual image search results to form a stitched URL; and
- an output component configured to transmit the stitched URL to a thumbnail server, wherein the thumbnail server stitches at least two individual search result images in the plurality of individuals image search results to create a search result compilation image, and provides the search result compilation image for display in association with a search engine results page (SERP), wherein providing each individual image search result in the plurality of individual image search results requires a quantity of hypertext transfer protocol (HTTP) requests that exceeds a quantity of HTTP requests required to provide the search result compilation image.

\* \* \* \* \*